United States Patent
Eckert

(10) Patent No.: US 7,366,233 B1
(45) Date of Patent: Apr. 29, 2008

(54) ASSEMBLY FOR MEASUREMENT DEMODULATION AND MODULATION ERROR DETECTION OF A DIGITALLY MODULATED RECEIVE SIGNAL

(75) Inventor: Hagen Eckert, Mering (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 923 days.

(21) Appl. No.: 09/856,954

(22) PCT Filed: Oct. 12, 2000

(86) PCT No.: PCT/EP00/10063

§ 371 (c)(1),
(2), (4) Date: Jul. 11, 2001

(87) PCT Pub. No.: WO01/30012

PCT Pub. Date: Apr. 26, 2001

(30) Foreign Application Priority Data

Oct. 15, 1999 (DE) ............................... 199 49 774

(51) Int. Cl.
 H04B 3/46 (2006.01)
 H04B 17/00 (2006.01)
 H04Q 1/20 (2006.01)
(52) U.S. Cl. .................. 375/224; 375/324; 375/340
(58) Field of Classification Search ................ 375/224, 375/226, 228, 232, 316–352
See application file for complete search history.

(56) References Cited

U.S. PATENT DOCUMENTS

| | | | |
|---|---|---|---|
| 4,825,449 A | 4/1989 | McKissock | |
| 5,001,724 A | 3/1991 | Birgenheier et al. | |
| 5,187,719 A | 2/1993 | Birgenheier et al. | |
| 5,799,038 A * | 8/1998 | Nowara et al. | 375/224 |
| 5,926,513 A * | 7/1999 | Suominen et al. | 375/346 |
| 5,974,098 A * | 10/1999 | Tsuda | 375/340 |
| 6,173,020 B1 * | 1/2001 | Nishimura | 375/341 |

FOREIGN PATENT DOCUMENTS

| | | |
|---|---|---|
| DE | 3834377 | 4/1990 |
| DE | 19515037 | 10/1995 |
| DE | 19811895 | 9/1999 |
| EP | 0805573 | 11/1997 |
| EP | 0847153 | 6/1998 |

* cited by examiner

*Primary Examiner*—Curtis Odom
(74) *Attorney, Agent, or Firm*—Birch, Stewart, Kolasch & Birch, LLP

(57) ABSTRACT

An arrangement for measurement demodulation and modulation error measurement of a digitally modulated receive signal, which has a receive filter and a following demodulator for error compensation and for determining the ideal symbol samples. The measuring signal that is filtered in a reference filter and weighting filtered is then evaluated in a following evaluation circuit. The output signal of the demodulator is fed via a measuring filter to the evaluation circuit and the weighting filter function is formed by cascaded filter functions of the receiver filter and measuring filter.

11 Claims, 1 Drawing Sheet

ASSEMBLY FOR MEASUREMENT DEMODULATION AND MODULATION ERROR DETECTION OF A DIGITALLY MODULATED RECEIVE SIGNAL

This application is the national phase under 35 U.S.C. § 371 of PCT International Application No. PCT/EP00/10063 which has an International filing date of Oct. 12, 2000, which designated the United States of America.

BACKGROUND OF THE INVENTION

1. Field of the Invention

The present invention relates to an arrangement for measurement demodulation and modulation error measurement of a digitally modulated receive signal.

2. Description of the Background Art

Measuring arrangements of this type are known (ETSI Tdoc SMG2 829/99, Meyr, Moeneclaey, Fechtel: "Digital Communication Receivers", WILEY INC, New York, 1997). They are used for modulation error measurement on digitally modulated receive signals. For data transmission in modern digital transmission technology, so-called digital modulation modes, which are known in many different variants, are used. The most frequently used modulation modes are the so-called PSK, QAM, MSK or FSK modulation methods. For data transmission, special transmit and receive filters are required at the transmitting and receiving ends, respectively, in order to achieve time intervals for the demodulation of the data, that are free of inter-symbol interference. For measurement purposes, special weighting filters have to be used in the receive path, instead of the receive filter.

FIG. 1 shows a known filter arrangement that is suitable for this purpose. The PSK modulated measuring signal, for example, passes after frequency conversion, not shown, A/D conversion and, if required, digital mixing, to the input of the measuring arrangement as a complex baseband signal. Receive filtering in a receive filter 1 (matched filter) initially takes place at this point, and in the following demodulator 2 signal errors such as mean frequency errors, initial phase errors, mean timing errors and the like are detected and eliminated. Furthermore, a symbol decision stage is provided in the demodulator 2, which generates the symbol samples of an ideal, reconstructed transmit signal from the error-free measuring signal, for example by quantisation of the IQ data, the phase or absolute value. The signal is then filtered by means of a reference filter 13. The reference filter 13 has the characteristic: reference filter=TX filter*weighting filter.

(Here the symbol "*" is used as a convolution operator and signifies convolution of the filter pulse responses in the time domain; both in the time domain and in the frequency domain the filter design itself can be achieved analytically and with approximation methods).

In this case the TX filter is the pulse-shaping filter used at the transmitting end of the respective transmission system. A weighting filter 11 is a filter that is specified according to the weighting standard. The input signal to be weighted in the weighting filter 11 is first delayed in a memory 9 and error-corrected in an error-correction stage 10 that is connected to the demodulator 2, and is then fed to the weighting filter 11. This weighting filter 11 is designed in accordance with the desired weighting function, for example in accordance with the ETSI specification. The ideal signal of the reference filter 13 and the weighted receive signal of the weighting filter 11 is then passed on to a following evaluation circuit 4 for further error detection, and finally to a display circuit 5 in which, in addition to the detected numerical modulation errors, measuring or reference signals as well as error signals derived from them, are numerically or graphically displayed. For further error detection in the evaluation circuit 4, for example, by comparing the two signals, further modulation errors, for example, error vector magnitude, magnitude error, phase error, respectively, are determined symbol-by-symbol or over a specific measurement period.

In the known arrangement, the original input signal has to be temporarily stored in a memory for later weighting filtering, and additional arithmetic operations are necessary for error correction of the original input signal prior to its weighting.

SUMMARY OF THE INVENTION

It is therefore an object of the present invention to simplify an arrangement of this type with regard to construction and computing effort.

In the arrangement according to the invention a buffer memory is superfluous, so are additional arithmetic operations for error correction. The corrected output signal of the demodulator is directly employed for weighting filtering.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention is explained in further detail below with the aid of an exemplary embodiment in FIG. 2.

Figure 1:
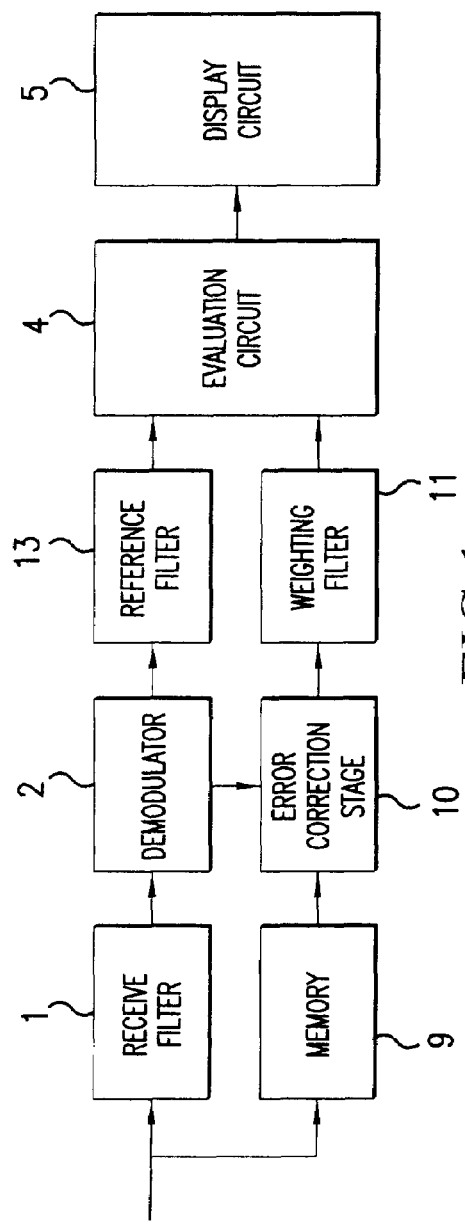
FIG. 1 is a schematic illustration of a conventional filter arrangement.
Figure 2:
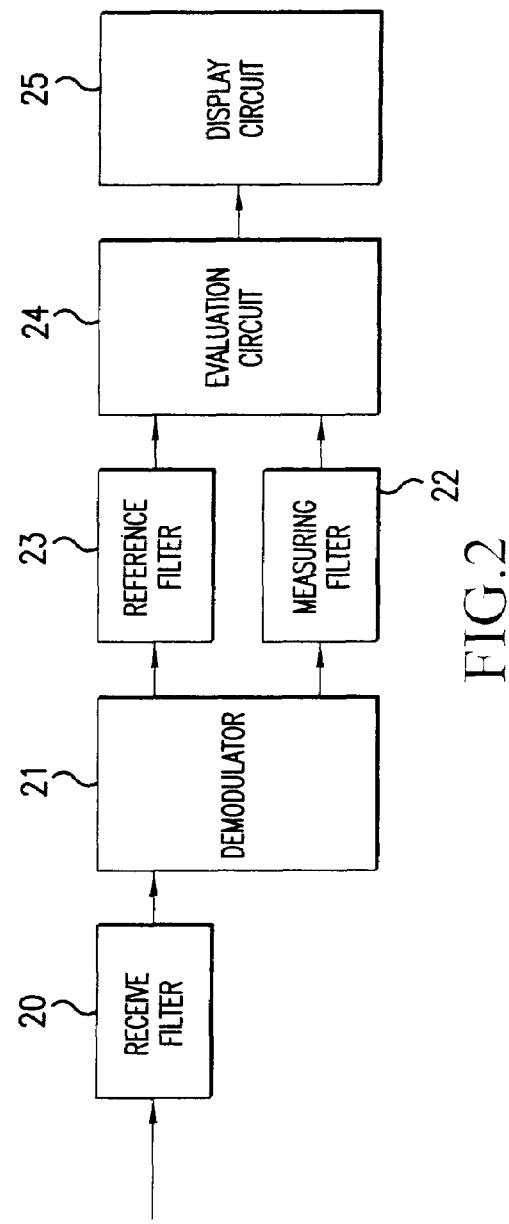
FIG. 2 is a schematic illustration according to a preferred embodiment of the present invention.

In the arrangement according to the invention in FIG. 2, the input signal is filtered in a receive filter 20 (RX filter) as is required by a following demodulator 21. The receive filter 20 can be designed, for example, so that ISI-free samples can be fed to the following demodulator 21. If a so-called Viterbi demodulator is used as demodulator, for example, the receive filter 20 can be matched to its demodulation characteristics. After detection and compensation of specific signal errors in the demodulator 21, a symbol decision stage of the demodulator 21 determines the ideal symbol samples from the error-corrected measuring signal. After these ideal symbol samples have undergone pulse shaping, these are fed to an evaluation circuit 24 via a reference filter 23 having the same characteristics as in the known arrangement in FIG. 1.

In contrast to the arrangement shown in FIG. 1, the error corrected measuring signal of the demodulator 21 is directly fed to a measuring filter 22, which has the following characteristic or approximation, respectively, within the permissible measurement tolerance:

weighting filter=receive filter*measuring filter

In the arrangement according to the invention the desired weighting filter characteristic, which meets the ETSI specification, for example, is therefore obtained by the cascaded filter characteristics of the receive filter 20 and the measuring filter 22, thus making an additional buffer memory superfluous, and the additional arithmetic operations for error correction, as are necessary in the known arrangement are also superfluous. The already error-corrected output signal of the demodulator 21 is used for the weighting filtering. In this arrangement the measuring filter 22 can also be made more simple, since the filter function of the preceding receive filter 23 is already taken into account in the weighting filtering. The output of the measuring filter 22 is connected to the evaluation circuit 24, for further evaluation as in the known arrangement shown in FIG. 1. Then, an output of the evaluation circuit 24 is displayed on a display circuit 25.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for demodulation and modulation error measurement of a digitally modulated receive signal with a receive filter, and a following demodulator for error compensation and for determining ideal symbol samples, wherein measuring signals are output from the demodulator, wherein a first measuring signal is filtered in a reference filter and a second measuring signal is filtered using a weighting filtered function, the first measuring signal and the second measuring signal are then evaluated in a following evaluation circuit, wherein the second measuring signal of the demodulators is filtered in a measuring filter and the weighting filter function is formed by cascaded functions of the receive filter and the measuring filter, with the demodulator directly between the receive and measuring filters, and wherein the weighting filtering function is determined by the convolution operation relationship: weighting filtering=receive filter*measuring filter such that the first measuring signal is directly passed from the demodulator to the measuring filter without having been delayed in a memory prior to being input to the demodulator.

2. The arrangement according to claim 1, wherein the receive filter is designed according to requirements of the demodulator for supplied signal characteristics.

3. The arrangement according to claim 2, wherein the receive filter is designed so that inter-symbol-interference-free samples are fed to the demodulator.

4. The arrangement according to claim 1, wherein the digitally modulated receive signal input to the receive filter is not split in two signals.

5. An arrangement for demodulation and modulation error measurement of a digitally modulated signal, the arrangement comprising:

a receive filter for receiving the digitally modulated signal and for filtering the digitally modulated signal;

a demodulator for receiving the filtered digitally modulated signal from the receive filter, for performing error correction to the received filtered digitally modulated signal and outputting a first measuring signal, and for determining ideal symbol samples from the first measuring signal and outputting a second measuring signal;

a reference filter for receiving the second measuring signal from the demodulator and for filtering the second measuring signal;

a measuring filter for receiving the first measuring signal from the demodulator and for weighting filtering the first measuring signal of the demodulator; and an evaluation circuit for evaluating the filtered second measuring signal from the reference filter and the weighting filtered first measuring signal from the measuring filter, wherein the weighting filter function for the first measuring signal is formed by cascaded functions of the receive filter and the measuring filter, with the demodulator directly between the receive and measuring filters, and wherein the weighting filtering function is determined by the convolution operation relationship: weighting filtering=receive filter*measuring filter such that the first measuring signal is directly passed from the demodulator to the measuring filter without having been delayed in a memory prior to being input to the demodulator.

6. The arrangement according to claim 5, wherein the receive filter is designed according to requirements of the demodulator for supplied signal characteristics.

7. The arrangement according to claim 6, wherein the receive filter is designed so that inter-symbol-interference-free samples are fed to the demodulator.

8. The arrangement according to claim 5, wherein the measuring filter receives the first measuring signal directly from the demodulator and the reference filter receives the second measuring signal directly from the demodulator.

9. The arrangement according to claim 5, wherein the digitally modulated signal input to the receive filter is not split in two signals.

10. A method for demodulation and modulation error measurement of a digitally modulated signal, the method comprising:

receiving the digitally modulated signal;

filtering the digitally modulated signal by a receive filter;

providing the filtered digitally modulated signal to a demodulator;

performing, by the demodulator, error correction to the filtered digitally modulated signal and outputting a first measuring signal and a second measuring signal;

filtering the first measuring signal in a reference signal by a reference filter, which receives the first measuring signal from the demodulator;

weighting the second measuring signal output from the demodulator by a measuring filter; and evaluating the filtered first measuring signal from the reference filter and the weighting filtered second measuring signal from the measuring filter by an evaluation circuit, wherein the weighting filter function for the second measuring signal is formed by cascaded functions of the receive filter and the measuring filter, with the demodulator directly between the receive and measuring filters, and wherein the weighting filtering function is determined by the convolution operation relationship: weighting filtering=receive filter*measuring filter such that the first measuring signal is directly passed from the demodulator to the measuring filter without having been delayed in a memory prior to being input to the demodulator.

11. The method according to claim 10, wherein the digitally modulated signal input to the receive filter is not split in two signals.

* * * * *